United States Patent
Kim et al.

(10) Patent No.: US 9,832,458 B2
(45) Date of Patent: Nov. 28, 2017

(54) MULTI VIEW IMAGE DISPLAY METHOD IN WHICH VIEWPOINTS ARE CONTROLLED AND DISPLAY DEVICE THEREOF

(71) Applicant: SAMSUNG ELECTRONICS CO., LTD., Suwon-si (KR)

(72) Inventors: Sung-yeol Kim, Suwon-si (KR); Seon-deok Hwang, Seoul (KR); Ho-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/676,484

(22) Filed: Apr. 1, 2015

(65) Prior Publication Data

US 2015/0296204 A1 Oct. 15, 2015

(30) Foreign Application Priority Data

Apr. 14, 2014 (KR) ........................ 10-2014-0044014

(51) Int. Cl.
   *H04N 13/04* (2006.01)
   *H04N 13/02* (2006.01)
(52) U.S. Cl.
   CPC ..... *H04N 13/0447* (2013.01); *H04N 13/0497* (2013.01); *H04N 13/0282* (2013.01)

(58) Field of Classification Search
   CPC .......................... H04N 13/0011; G06T 7/0022
   USPC ..................................... 345/619, 419; 348/42
   See application file for complete search history.

(56) References Cited

U.S. PATENT DOCUMENTS

| | | | |
|---|---|---|---|
| 6,064,424 A | 5/2000 | van Berkel et al. | |
| 8,134,590 B2 | 3/2012 | De Zwart et al. | |
| 8,731,279 B2* | 5/2014 | Shin ................... | H04N 13/0011 348/42 |
| 2007/0122027 A1 | 5/2007 | Kunita et al. | |
| 2009/0079761 A1* | 3/2009 | Kokojima .......... | H04N 13/0011 345/619 |
| 2010/0026712 A1* | 2/2010 | Aliprandi ........... | H04N 13/0011 345/629 |

FOREIGN PATENT DOCUMENTS

| | | |
|---|---|---|
| JP | 4052331 B2 | 2/2008 |
| KR | 10-2009-0031230 A | 3/2009 |
| KR | 10-2012-0063984 A | 6/2012 |
| KR | 10-2013-0070303 A | 6/2013 |

* cited by examiner

*Primary Examiner* — Devona Faulk
*Assistant Examiner* — Kevin Wu
(74) *Attorney, Agent, or Firm* — Sughrue Mion, PLLC

(57) ABSTRACT

A multi view image display device is provided, which includes a depth estimator configured to estimate depth of an input image, a renderer configured to perform rendering of multi view image based on the estimated depth, a display configured to display the rendered multi view image, and a controller configured to control the rendering of the multi view image by controlling the number of rendering viewpoints according to a depth value of at least one object region included in the input image.

16 Claims, 13 Drawing Sheets

MULTI VIEW IMAGE DISPLAY METHOD IN WHICH VIEWPOINTS ARE CONTROLLED AND DISPLAY DEVICE THEREOF

RELATED APPLICATION

This application claims priority under 35 U.S.C. §119(a) to Korean Patent Application No. 10-2014-0044014, filed on Apr. 14, 2014, in the Korean Intellectual Property Office, the disclosure of which is incorporated herein by reference in its entirety.

BACKGROUND

1. Field

Apparatuses and methods consistent with exemplary embodiments relate to a multi view image display device and a display method thereof, and more particularly to a non-glasses type multi view image display device and a display method thereof.

2. Description of the Related Art

Various types of electronic devices have been developed and put to use. Particularly, in recent years, developments in display devices, such as televisions (TVs), which are appliances typically used in the home, have progressed rapidly.

As the performance of display devices has advanced, the types of content that can be displayed on the display devices has also increased. In particular, stereoscopic three-dimensional (3D) display systems which can display 3D content have recently been developed and are in wide use.

3D display devices may be used not only in 3D TVs used in the home but also in any of various types of display devices, such as monitors, mobile phones, personal digital assistants (PDAs), set-top personal computers (PCs), tablet PCs, digital photo frames, and kiosks. Furthermore, 3D display technology may be used not only into home use but also in diverse fields that can benefit from 3D imaging, such as science, medicine, design, education, advertisement, and computer games.

3D display systems are classified as non-glasses type systems that are viewable without glasses and glasses type systems that are viewable using glasses.

A glasses type system can provide a satisfactory 3D effect, but the required glasses may be inconvenient. In contrast, a non-glasses type system has the advantage that the viewer can view a 3D image without glasses, and the development of such a non-glasses type system has been continuously discussed.

In the case of a non-glasses type system, an image is generated using a plurality of multi view images. If the number of rendering viewpoints is small, it may be difficult to achieve seamless view switching, and thus it may be beneficial to perform rendering using a maximum number of rendering viewpoints. However, while increasing the number of rendering viewpoints may make it possible to achieve seamless view switching, if the number of rendering viewpoints is too large, a blurring phenomenon may occur causing a deterioration in the sharpness of an object (or region) that projects or is recessed significantly.

SUMMARY OF THE INVENTION

One or more exemplary embodiments may address at least the above problems and/or disadvantages and to provide at least the advantages described below. Accordingly, one or more exemplary embodiments may provide a multi view image display device and a display method thereof, which can provide sharp 3D images with natural viewpoint switching maintained through controlling the number of rendering viewpoints by regions according to depth values.

According to an aspect of an exemplary embodiment, a multi view image display device includes a depth estimator configured to estimate depth of an input image; a renderer configured to perform rendering of a multi view image based on the estimated depth; a display configured to display the rendered multi view image; and a controller configured to control the rendering of the multi view image by controlling the number of rendering viewpoints according to a depth value of at least one object region included in the input image.

The display may include a display panel on which the rendered multi view image is displayed; and a viewing zone separator arranged on a front surface of the display panel to provide different optical views according to different viewing regions.

The controller may control the rendering of the multi view image by controlling the number of rendering viewpoints of the at least one object region to be smaller than the number of rendering viewpoints of a remaining region if the depth of the at least one object region is equal to or larger than a predetermined depth value.

The controller may control the rendering of the multi view image by replacing at least one viewpoint of the multi view image with another viewpoint of the multi view image, so that at least a part of the multi view image that constitutes the at least one object region is repeated.

The controller may control the rendering of the multi view image by replacing at least one viewpoint of the multi view image with another viewpoint of the multi view image that constitutes the at least one object region, wherein the another viewpoint is adjacent to the at least one viewpoint and provides the same optical view.

The multi view image display device may further include a storage configured to store a multi view image table according to depth information, wherein the controller controls the rendering of the multi view image using the multi view image table that corresponds to the estimated depth information based on the multi view image table stored in the storage.

The controller may control the number of rendering viewpoints of the at least one object region to be equal to or smaller than a predetermined first number if the depth of the at least one object region is equal to or larger than a predetermined first depth value, and may control the number of rendering viewpoints of the at least one object region to be equal to or smaller than a predetermined second number if the depth of the at least one object region is equal to or larger than a predetermined second depth value.

The second depth value may be larger than the first depth value, and the second number may be smaller than the first number.

The estimated depth information and the number of rendering viewpoints may be linearly or nonlinearly in reverse proportion to each other.

According to an aspect of another exemplary embodiment, a multi view image display method includes estimating depth of an input image; rendering the multi view image by differently controlling the number of rendering viewpoints according to a depth value of at least one object region included in the input image; and displaying the rendered multi view image.

A display that displays the multi view image may include a display panel on which the rendered multi view image are displayed; and a viewing zone separator arranged on a front surface of the display panel to provide different optical views according to different viewing regions.

The rendering the multi view image may perform rendering of the multi view image by controlling the number of rendering viewpoints of the at least one object region to be smaller than the number of rendering viewpoints of a remaining region if the depth of the at least one object region is equal to or larger than a predetermined depth value.

The rendering the multi view image may perform the rendering of the multi view image through replacement of at least one viewpoint of the multi view image so that at least one viewpoint of the multi view image that constitutes the at least one object region is repeated.

The rendering the multi view image may perform the rendering of the multi view image through replacement of the at least one viewpoint of the multi view image that constitutes the at least one object region with an adjacent viewpoint of the multi view image that provides the same optical view.

The rendering the multi view image may perform the rendering of the multi view image using a multi view image table that corresponds to the estimated depth information based on the multi view image table according to pre-stored depth information.

The rendering the multi view image may perform the rendering of the multi view image by controlling the number of rendering viewpoints of the at least one object region to be equal to or smaller than a predetermined first number if the depth of the at least one object region is equal to or larger than a predetermined first depth value and by controlling the number of rendering viewpoints of the at least one object region to be equal to or smaller than a predetermined second number if the depth of the at least one object region is equal to or larger than a predetermined second depth value.

The second depth value may be larger than the first depth value, and the second number may be smaller than the first number.

The estimated depth information and the number of rendering viewpoints may be linearly or nonlinearly in reverse proportion to each other.

According to various exemplary embodiments described herein, a non-glasses type 3D system which increases sharpness of an image and decreases visual fatigue can be provided.

BRIEF DESCRIPTION OF THE DRAWINGS

The above and/or other exemplary aspects, features and advantages will be more apparent from the following detailed description when taken in conjunction with the accompanying drawings, in which.

DETAILED DESCRIPTION OF EMBODIMENTS OF THE PRESENT INVENTION

Hereinafter, various exemplary embodiments will be described in detail with reference to the accompanying drawings.

Figure 1:
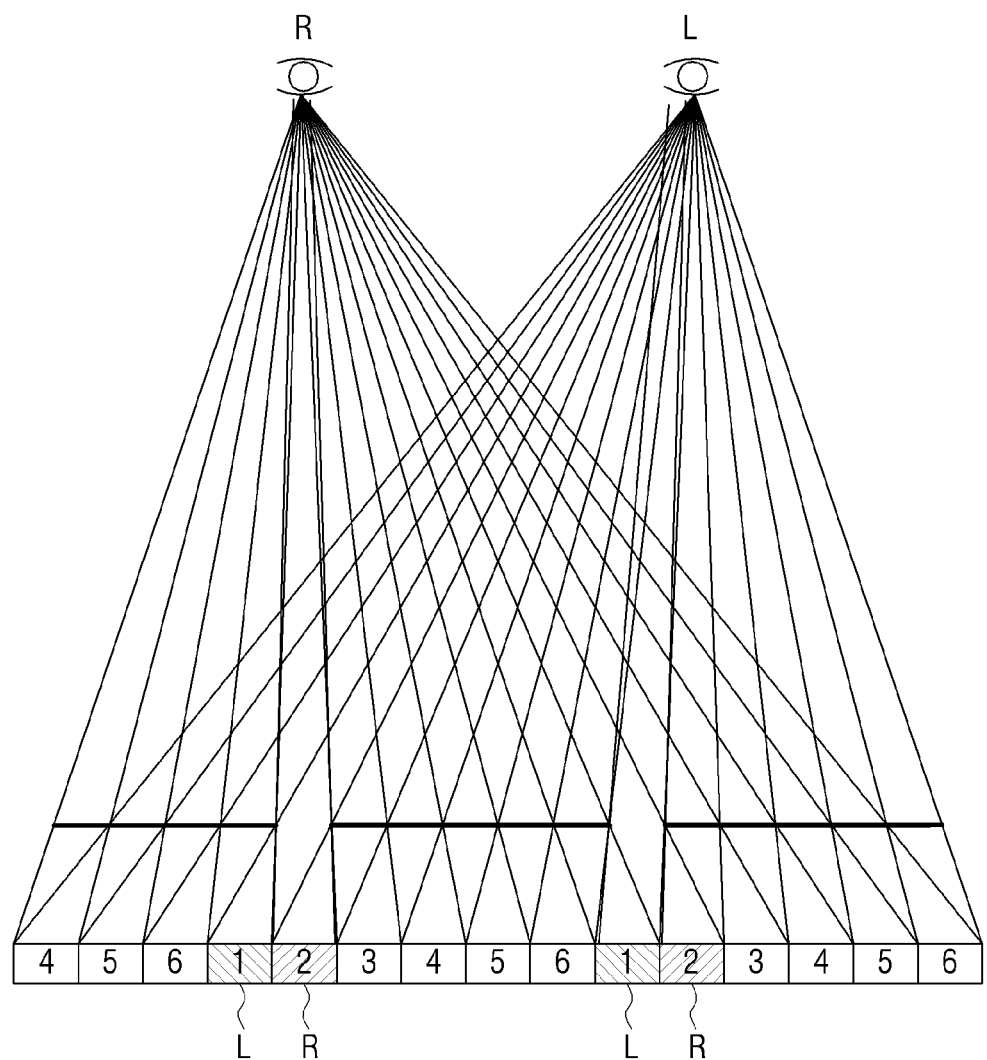
FIG. 1 is a view explaining the operation of a display device according to an exemplary embodiment.

FIG. 1 is a view explaining the operation of a non-glasses type 3D display device to help understanding.

FIG. 1 shows the operation type of a device that provides a 3D image in a non-glasses manner through the display of a multi view image according to an exemplary embodiment. Here, the term "multi view image" is used to refer to a plurality of images that are obtained by capturing multiple images of the same object at different angles. That is, the multi view image provides images that are obtained by refracting a plurality of images captured at different viewpoints and focusing the refracted images on a position that is separated from a display by a predetermined distance (e.g., about 3 meters) that is called a viewing distance. Such a position where images are formed is called a viewing region (or an optical viewing region). Accordingly, if one eye of a user is positioned at a first viewing region and the other eye is positioned at a second viewing region, the user can perceive a 3D effect.

As an example, FIG. 1 is a view explaining the display operation of a multi view image having a total of six viewpoints. Referring to FIG. 1, the non-glasses 3D display device may enable light that corresponds to an image of a first viewpoint, from among the six total viewpoints, to be projected onto a viewing region corresponding to the left eye and enable light that corresponds to an image of a second viewpoint, from among the six total viewpoints, to be projected onto a viewing region corresponding to the right eye. Accordingly, the user views images of different viewpoints through the left eye and the right eye, respectively, and thus can perceive a 3D effect.

Figure 2A:
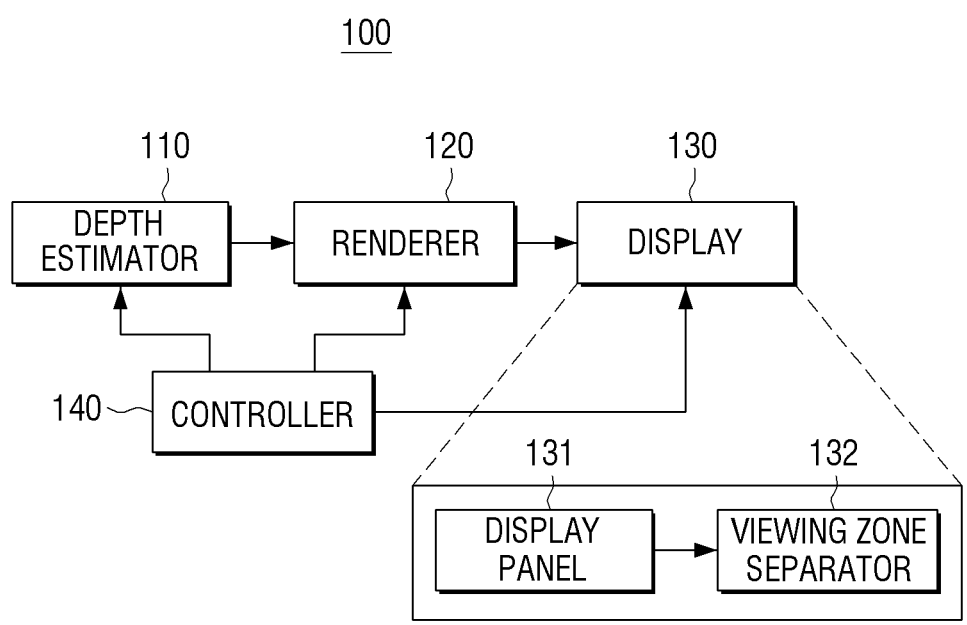
FIGS. 2A and 2B are block diagrams illustrating the configuration of a display device according to various exemplary embodiments.
Figure 2B:
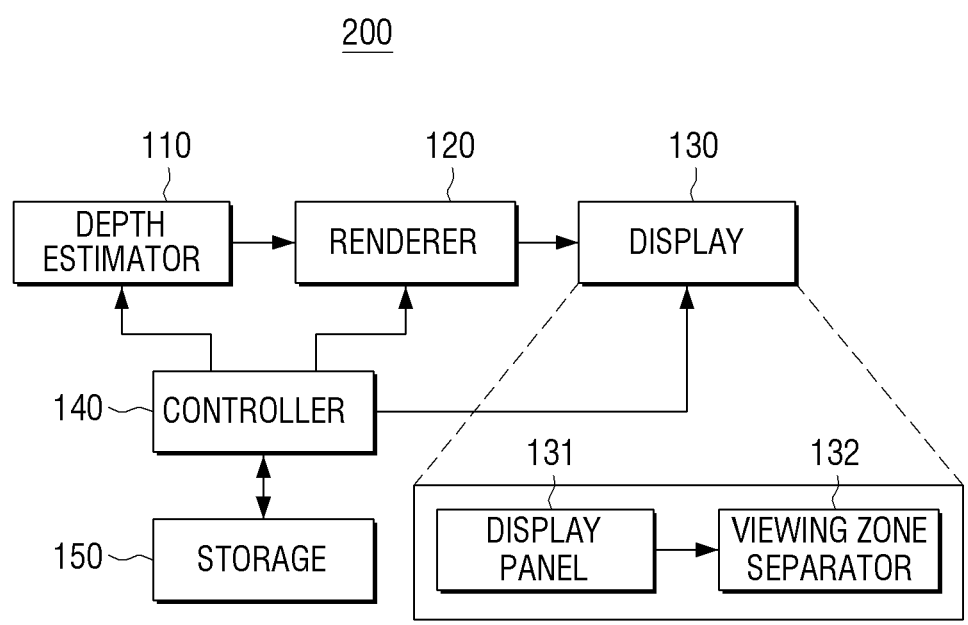

FIGS. 2A and 2B are block diagrams illustrating the configuration of a multi view image display device according to exemplary embodiments.

FIG. 2A is a block diagram illustrating the configuration of a multi view image display device according to an exemplary embodiment.

Referring to FIG. 2A, a multi view image display device 100 includes a depth estimator 110, a renderer 120, a display 130, and a controller 140.

The multi view image display device 100 may be implemented by one of any of various types of display devices, such as a TV, a monitor, a PC, a kiosk, a tablet PC, a digital photo frame, and a mobile phone.

An image inputter (not illustrated) receives an input of an image and depth information. Specifically, the image inputter may receive an image and depth information of the image from any of various kinds of external devices, such as external storage media, broadcasting stations, and web servers. The input image may be any one of a single view image, a stereoscopic image, and a multi view image. A single view image is an image that is captured using a typical image capturing device, and a stereoscopic image is a 3D video image that is captured using a stereoscopic image capturing device and includes only a left-eye image and a right-eye image. Typically, a stereoscopic image capturing device is an image capturing device including two lenses and is used to capture a 3D image. A multi view image is a 3D video image which can provide a user with various viewpoints in several directions using geometric calibration and spatial synthesis of images that are captured through one or more image capturing devices.

The image inputter may also receive depth (or disparity) information of an image. The depth information of an image may include depth values that are given with respect to the pixels of an image, and as an example, an 8-bit depth may have grayscale values in a range of 0 to 255. For example, in the case of indicating a black/white based depth, black (low value) indicates a location that is far from a viewer, and white (high value) indicates a location that is close to the viewer.

The depth information is information that indicates the depth of a 3D image, and specifically, information that corresponds to the degree of binocular parallax between the left-eye image and a right-eye image which constitute the entire 3D image. That is, if the depth is high, the left/right binocular parallax is high, and a viewer may perceive a relatively high 3D effect, while if the depth is low, the left/right binocular parallax is low, and a viewer may perceive a relatively low 3D effect. In general, the depth information may be acquired through a passive method in which only 2D characteristics of an image are obtained, such as in stereo matching, or an active method in which specialized equipment, such as a depth camera, may be used. Alternately, the depth information may be in the form of a depth map.

a depth map is a table that includes the depth information with respect to regions of an image. An image may be divided into regions according to pixels, and each region may be a predetermined region that is larger than a single pixel unit. As an example, according to a depth map, a grayscale value of 127 or 128, among the grayscale values of 0 to 255, may be set as a reference value, i.e., 0 (or a focal plane), and a value that is smaller than 127 or 128 may indicate as a negative (−) value, while a value that is larger than 127 or 128 may indicate a positive (+) value. The reference value of the focal plane may be optionally selected from the values of 0 to 255. A negative (−) value represents a recess, and a positive (+) value represents a projection.

The depth estimator 110 estimates the depth (or disparity) of an input image based on the depth information. Specifically, the depth estimator 110 may estimate the depth of each object region that constitutes the input image based on the received depth information.

The renderer 120 performs rendering of the multi view image based on the depth that is estimated by the depth estimator 110.

Specifically, in the case of a 2D image, the renderer 120 may perform rendering of the multi view image based on the depth information that is extracted through 2D/3D conversion. In a case in which a multi view image, i.e., an image including N views and corresponding N pieces of depth information, is input, the renderer 120 may perform rendering of the multi view image based on at least one view and depth information from among the N views and the corresponding N pieces of depth information. In a case in which only N views are input, the renderer 120 may extract the depth information from the N views, and may perform rendering of the multi view image based on the extracted depth information.

As an example, the renderer 120 may generate a leftmost view and a rightmost view, which become the basis of the multi view image, through selection of a 3D image, i.e., one of the left-eye image and the right-eye image, as a reference view (or center view). In this case, the renderer 130 may generate the leftmost view and the rightmost view based on the corrected depth information that corresponds to one of the left-eye image and the right-eye image that is selected as the reference view.

If the leftmost view and the rightmost view are generated, the renderer 120 may perform rendering of the multi view image by generating a plurality of interpolation views between the center view and the leftmost view and generating a plurality of interpolation views between the center view and the rightmost view, but methods are not limited thereto. It is also possible to generate extrapolation views through an extrapolation technique. In a case of performing rendering of a multi view image based on a 2D image and the depth information, the 2D image may be selected as the center view.

The above-described operation of the renderer 120 is merely exemplary, and the renderer 120 may perform rendering of the multi view image according to any of various methods.

The display 130 functions to provide multi view (or optical multi view). The display 130 includes a display panel 131 and a viewing zone separator 132 to provide the multi view.

The display panel 131 includes a plurality of pixels, each of which is composed of a plurality of sub-pixels. The sub-pixels may include R (Red), G (Green), and B (Blue) sub-pixels. That is, each pixel is composed of an R sub-pixel, a G sub-pixel, and a B sub-pixel, and a plurality of pixels are arranged in a plurality of rows and columns to form the display panel 121. The display panel 131 may be implemented by any of various display units, such as an LCD (Liquid Crystal Display) panel, a PDP (Plasma Display Panel), an OLED (Organic Light Emitting Diode) panel, a VFD (Vacuum Fluorescent Display), an FED (Field Emission Display), and an ELD (Electro Luminescence Display).

The display panel 131 displays rendered multi view image frames. Specifically, the display panel 131 may display image frames in which a plurality of images having different viewpoints are repeated and are sequentially arranged.

Although not illustrated in FIG. 2A, in a case in which the display panel 131 is implemented by an LCD panel, the display device 200 may further include a backlight unit (not illustrated) configured to supply light to the rear of the display panel 131 and a panel driver (not illustrated) configured to drive pixels of the display panel 131 in accordance with pixel values of the pixels constituting the image frame.

The viewing zone separator 132 may be arranged on the front surface of the display panel 131 to provide a multi view image having different viewpoints projected to different viewing regions. In this case, the viewing zone separator 132 may be a lenticular lens or a parallax barrier.

For example, the viewing zone separator 132 may be a lenticular lens that includes a plurality of lens regions. Accordingly, the lenticular lens can refract an image that is displayed on the display panel 131 through the plurality of lenses of the lens array. Each lens or lens region has a size that corresponds to at least one pixel, and diffracts and disperses the light incident thereon so that light from different pixels may be transmitted to different viewing regions.

As another example, the viewing zone separator 132 may be a parallax barrier. The parallax barrier may be a transparent slit array including a plurality of barrier regions. Accordingly, the parallax barrier operates to emit different viewpoint images to different viewing regions by blocking light that is incident on the barrier regions between the slits.

The viewing zone separator 132 may be inclined at a predetermined angle to improve the picture quality. The controller 140 may divide a multi view image based on the inclined angle of the viewing zone separator 132, and may generate the image frames accordingly. Thus, a user does not view an image that is displayed in a vertical or horizontal direction on the sub-pixels of the display panel 131, but rather, views an image that is displayed with predetermined inclination with respect to the sub-pixels.

Figure 3:
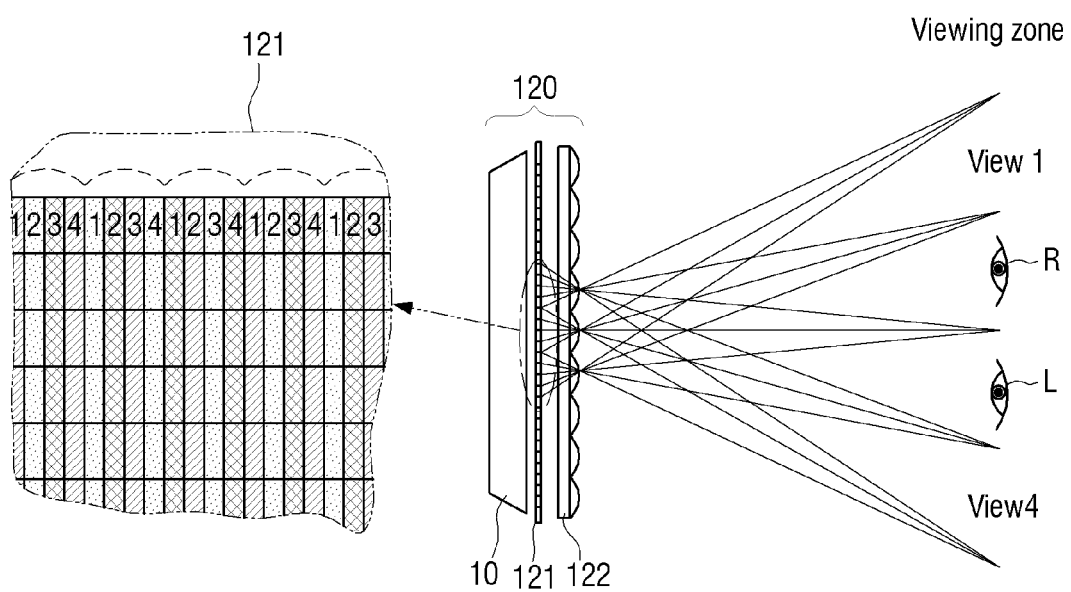
FIG. 3 is a view explaining an implementation example of a display according to an exemplary embodiment.

FIG. 3 is a view explaining an example of a display 320 according to an exemplary embodiment.

Referring to FIG. 3, the display 130 includes a display panel 131, a viewing zone separator 132, and a backlight unit 10.

In the example of FIG. 3, the viewing zone separator 132 is a lenticular lens array.

Referring to FIG. 3, the display panel 121 includes a plurality of pixels that are grouped into a plurality of columns. Each column of pixels corresponds to an image of a different viewpoint. Referring to FIG. 3, a plurality of images 1, 2, 3, and 4, corresponding, respectively, to first through fourth viewpoints, are repeatedly and sequentially arranged. That is, the respective pixel columns are arranged as numbered groups 1, 2, 3, and 4. A graphic signal is applied to the panel such that pixel column 1 displays a first image, and pixel column 2 displays a second image.

The backlight unit 10 provides light to the display panel 131. Using light that is provided from the backlight unit 10, images 1, 2, 3, and 4, which are formed on the display panel 131, are projected onto the viewing zone separator 132, and the viewing zone separator 132 transmits the respective projected images 1, 2, 3, and 4 toward the viewer. That is, the viewing zone separator 132 generates exit pupils at the viewer's position, that is, at a viewing distance. The thickness and diameter of each lenticular lens in a lenticular lens array used as a viewing zone separator, and the spacing of slits in a parallax barrier used as a viewing zone separator, may be configured so that the exit pupils that are generated by the respective columns are separated, at the viewing distance, by an average inter-pupillary distance of less than 65 mm. The separated image light form the viewing regions, respectively. That is, in the case in which first through fourth views are formed as illustrated in FIG. 3, and the user's left eye and right eye are positioned at second and third views, respectively, the viewer can perceive a 3D image.

The controller 140 may control the rendering of the multi view image by controlling the number of rendering viewpoints according to the depth value of at least one object region included in the input image.

Specifically, if the depth of the at least one object region included in the input image, based on the depth information estimated by the depth estimator 110, satisfies a predetermined reference, the controller 140 may control the renderer 120 to control the number of rendering viewpoints of the at least one object region.

In particular, the controller 140 may control the rendering of the multi view image by controlling the number of rendering viewpoints of the at least one object region to be smaller than the number of rendering viewpoints of the remaining region if the depth of the at least one object region is equal to or larger than a predetermined depth value. For example, if the total number of rendering viewpoints is 35, the controller 140 may control the rendering with respect to the object region having the depth value that is equal to or larger than the predetermined depth value using 7 multi view images.

Specifically, the controller 140 may control the rendering of the multi view image so that at least a part of the multi view image that constitutes the at least one object region included in the input image is repeated. For example, if the corresponding object region includes images of first through ninth viewpoints, the controller 140 may control the rendering of the multi view image through replacement of the third viewpoint image with the second viewpoint image, and replacement of the remaining images in a similar manner.

In this case, the controller 140 may control the rendering of the multi view image through replacement of at least one viewpoint image of the multi view image that constitutes the at least one object region with an image of an adjacent viewpoint that provides the same optical view. For example, in the case where the viewpoint images 1, 2, and 3 provide the first optical view, the controller 140 may replace viewpoint image 2 with the viewpoint images 1 and 3, or may replace the viewpoint images 1 and 3 with the viewpoint image 2.

Further, the controller 140 may control the number of rendering viewpoints of the at least one object region to become equal to or smaller than a predetermined first number if the depth of the at least one object region is equal to or larger than a predetermined first depth value, and may control the number of rendering viewpoints of the at least one object region to become equal to or smaller than a predetermined second number if the depth of the at least one object region is equal to or larger than a predetermined second depth value. The second depth value may be larger than the first depth value, and the second number may be smaller than the first number. That is, the controller 140 may perform the rendering of a multi view image by decreasing the number of rendering viewpoints t as the depth value is increased.

FIG. 2B is a block diagram illustrating the configuration of a multi view image display device according to another embodiment of the present disclosure.

Referring to FIG. 2B, a multi view image display device 200 includes a depth estimator 110, a renderer 120, a display 130, a controller 140, and a storage 150. Since the configuration of the depth estimator 110, the renderer 120, and the display 130 as illustrated in FIG. 2B is the same as the configuration as illustrated in FIG. 2A, an additional detailed explanation thereof will be omitted.

The storage 150 stores a multi view image table according to depth information. The multi view image table may be a table in which a multi view image replacement method for controlling the number of rendering viewpoints according to depth values is defined.

Figure 5:
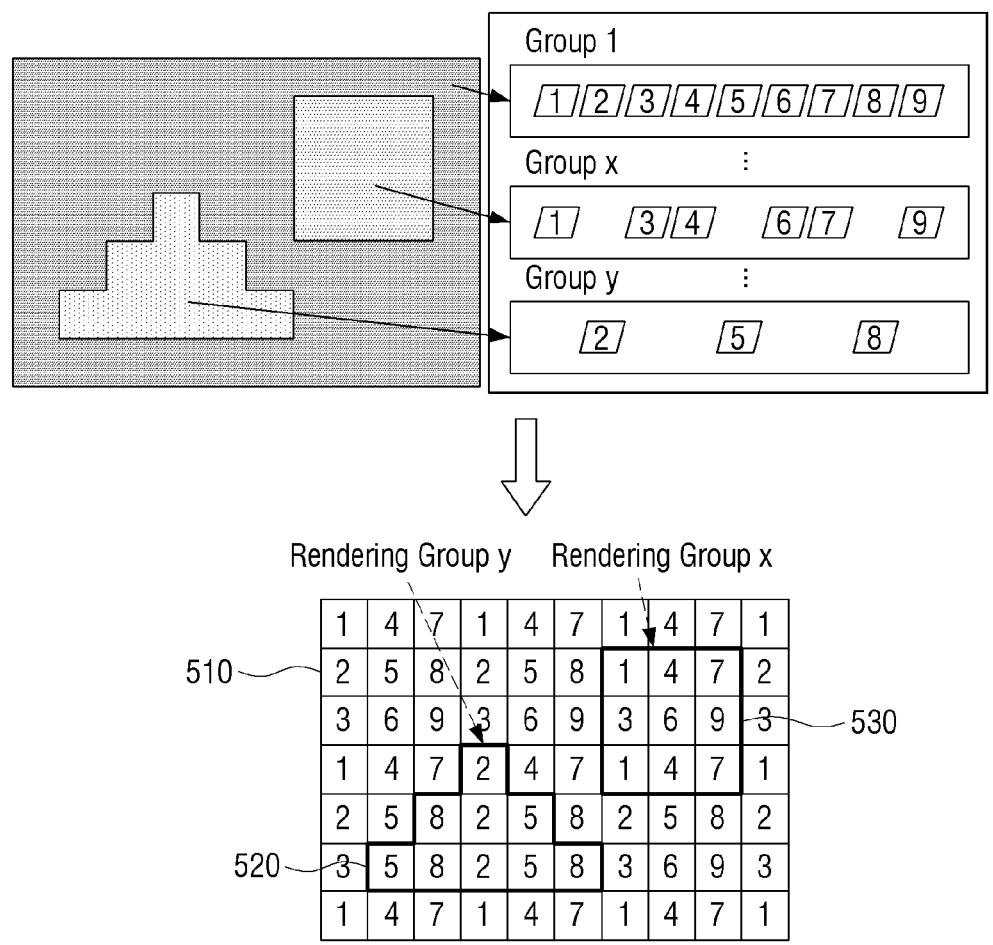
FIG. 5 is a view explaining a method for controlling a rendering view according to an exemplary embodiment.

For example, in the multi view image table, it may be defined that the number of rendering viewpoints is decreased by 20% with respect to the depth value in periods 0 to 4, and the number of rendering viewpoints is decreased by 30% with respect to the depth value in periods 5 to 8. For example, the table may be in the form as illustrated in FIG. 5.

In this case, the controller 140 may control the rendering of the multi view image using the multi view image table that corresponds to the estimated depth information based on the table stored in the storage 150.

Figure 4:
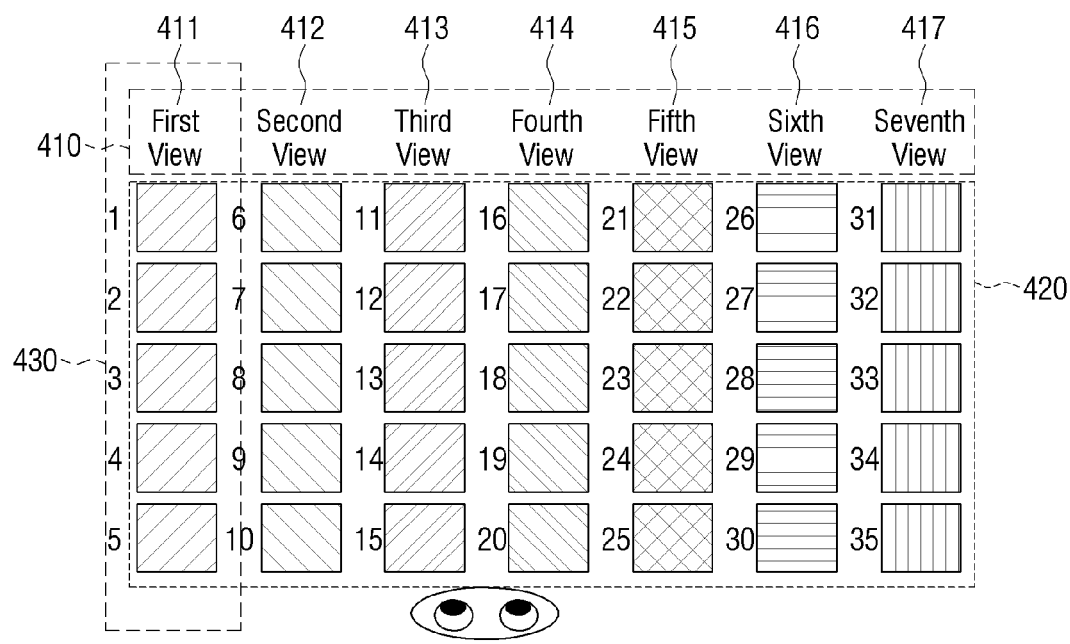
FIG. 4 is a view explaining a method for forming a multi view according to an exemplary embodiment.

FIG. 4 is a view explaining a method for forming a multi view according to an exemplary embodiment.

As illustrated in FIG. 4, a display device 100 may provide seven optical views 411 to 417, and each optical view may be composed of five multi view images (or sub-views). That is, seven optical views 411 to 417 may be generated using 35 (1 through 35) multi view images, 420 in total. For example, the first optical view 411 may be generated by synthesizing multi view images 1 to 5. However, this is merely exemplary, and the number of optical views and the number of multi view images that constitute each of the optical views may differ. In the case of controlling the number of rendering viewpoints based this method for forming a multi view, the number of rendering viewpoints can be controlled by replacement of the images in the multi view image with other images that constitute the same optical view.

FIG. 5 is a view explaining a method for controlling a rendering view according to an exemplary embodiment of the present disclosure.

In FIG. 5, for convenience in explanation, a case is shown in which 9 multi view images constitute three optical views is exemplified.

As illustrated in FIG. 5, it is assumed that an input image includes a first object region 520 and a second object region 530, a background region 510 corresponds to a focal plane region having a depth value of "0", and the first and second object regions 520 and 530 have depth values of 3 and 5, respectively.

In this case, the background region 510 may be rendered according to a typical multi view image generating method. That is, the multi view image may be rendered in a format in which 9 multi view images in total are sequentially arranged. Accordingly, the background region 510 may be composed of the multi view image of group 1 that includes 9 multi view images in total.

Further, the first object region 520 may be rendered in a format in which only 6 multi view images in total are arranged. That is, as illustrated, viewpoint image 2 may be replaced by viewpoint image 1, viewpoint image 5 may be replaced by viewpoint image 4, and viewpoint image 8 may be replaced by viewpoint image 7. Accordingly, the first object region 520 may be composed of, for example, a multi view image of group x that includes 6 multi view images in total.

The second object region 530 may be rendered in a format in which only 3 multi view images in total are arranged. That is, as illustrated, viewpoint images 1 and 3 may be replaced by viewpoint image 2, viewpoint images 4 and 6 may be replaced by viewpoint image 5, and viewpoint images 7 and 9 may be replaced by viewpoint image 8. Accordingly, the second object region 530 may be composed of, for example, a multi view image of group y that includes 3 multi view images in total.

This configuration of the multi view image groups for controlling the number of rendering viewpoints according to the depth values of the object region may be pre-stored in the form of a table that corresponds to the depth values.

FIGS. 6A to 6E are diagrams explaining the relationship between a depth (or parallax) and the rendering number according to an exemplary embodiment.

Figure 6A:
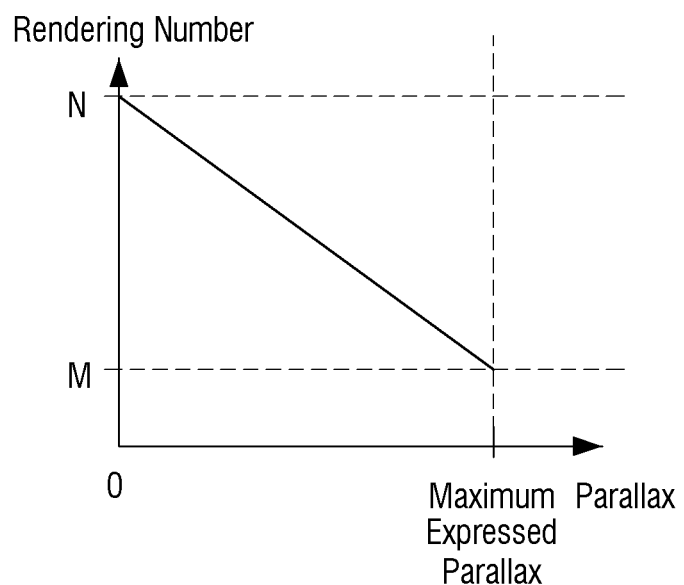
FIGS. 6A to 6E are diagrams explaining the relationship between a depth (or parallax) and the rendering number according to an exemplary embodiment.
Figure 6B:
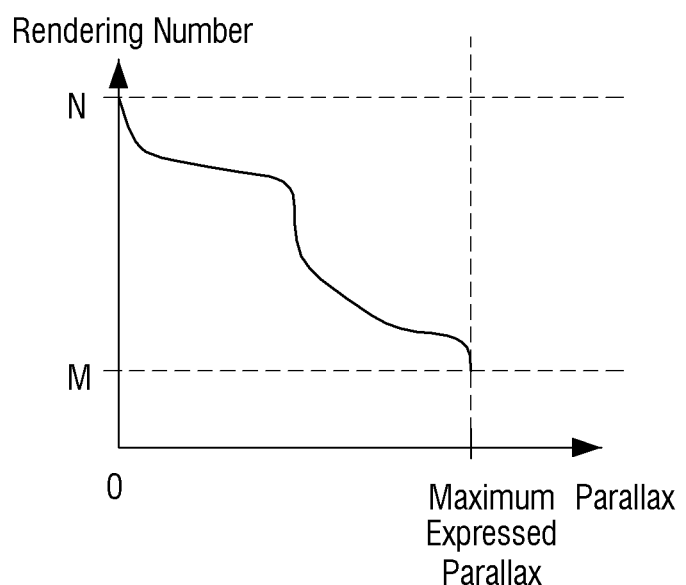

As illustrated in FIGS. 6A and 6B, the rendering number may be linearly in reverse proportion to the size of the depth (or parallax) (FIG. 6A) or nonlinearly in reverse proportion to the size of the depth (or parallax) (FIG. 6B). That is, as the size of the depth is increased, the rendering number may be decreased. For example, in the case of a 3D display that is designed to have low-level crosstalk, the number of rendering viewpoints is increased, and thus the blurring phenomenon occurs. In this case, through a decrease of the rendering number as the size of the depth is increased, a sharp 3D image can be implemented.

Figure 6C:
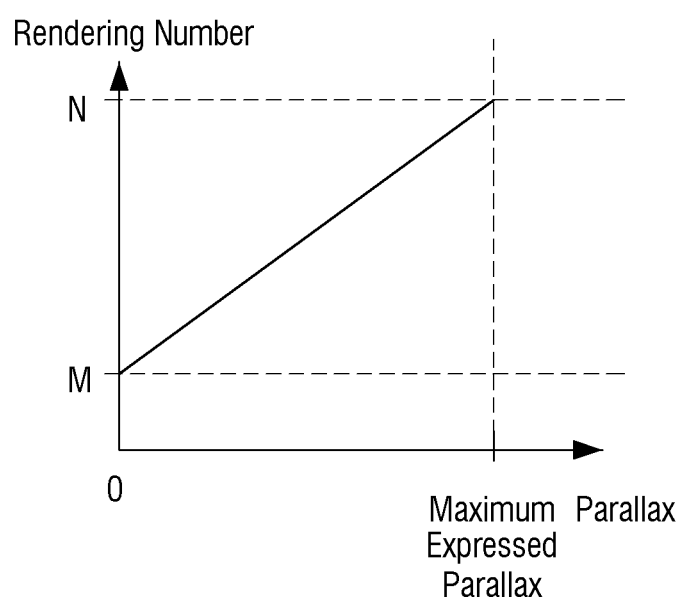
Figure 6D:
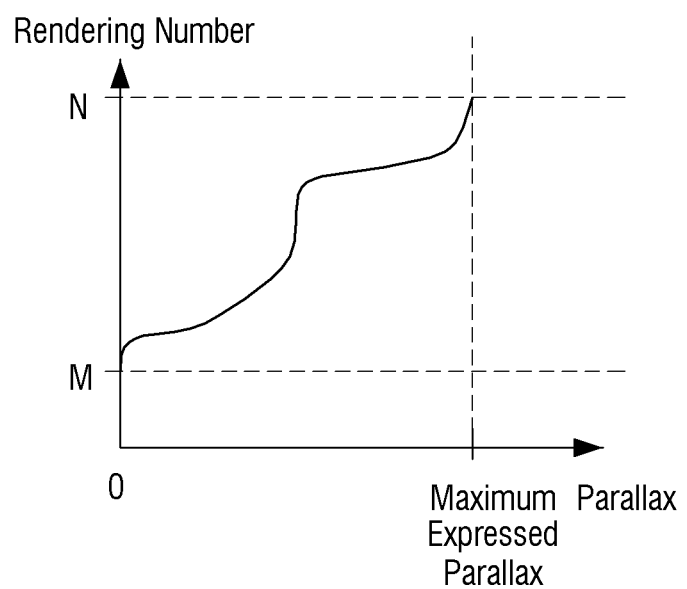

Further, as illustrated in FIGS. 6C and 6D, the rendering number may be in linear proportion to the size of the depth (or parallax) (FIG. 6C) or in non-linear proportion to the size of the depth (or parallax) (FIG. 6D). That is, as illustrated, as the size of the depth is increased, the rendering number may be increased. For example, in the case of a 3D display that is designed to have a high-level of crosstalk, blurring phenomenon due to the crosstalk rather than blurring phenomenon due to the number of rendering viewpoints occurs. This is because as the crosstalk becomes greater, aliasing becomes more severe and causes image distortion to occur. In this case, through an increase of the rendering number as the size of the depth is increased, a 3D image having no distortion can be implemented.

Figure 6E:
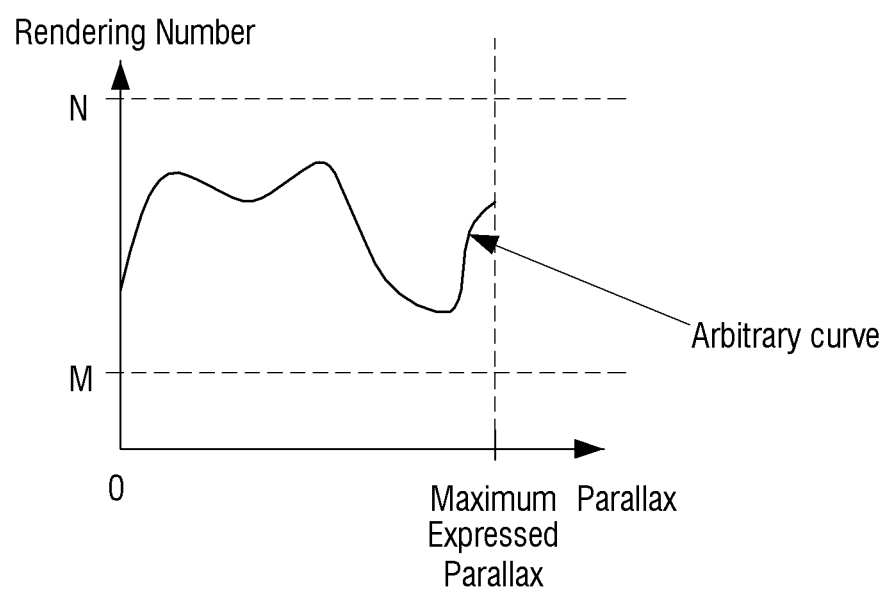

Further, as illustrated in FIG. 6E, the rendering number may be unrelated to the size of the depth (or parallax), or may have another relationship with respect to the size of the depth (or parallax). For example, a blurring function relationship between the crosstalk and the rendering number may not be proportional or reversely proportional. In this case, a natural 3D image can be implemented through adaptively increasing or decreasing the rendering number according to the depth.

Figure 7:
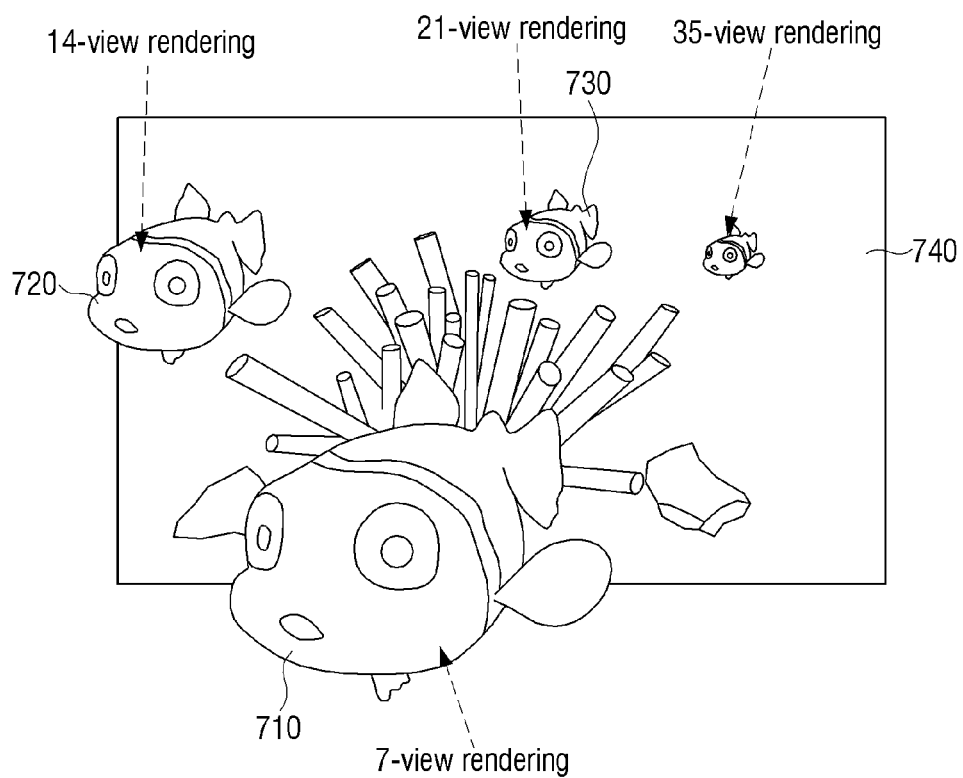
FIG. 7 is a view illustrating a state where the number of rendering viewpoints of an object region is controlled on the basis of a depth according to an exemplary embodiment.

FIG. 7 is a view illustrating a state in which the number of rendering viewpoints of an object region is controlled on the basis of a depth according to an exemplary of the present disclosure.

As illustrated in FIG. 7, the multi view rendering number of each object region may differ depending on the depth (or parallax) of each object region included in a 3D image. For example, an object region 710 having the highest-level depth may be rendered to 7 multi view images among 35 multi view images in total, an object region 720 having the next-level depth may be rendered to 14 multi view images, and an object region 730 having the next-level depth may be rendered to 21 multi view images. Further, a background region 740 having no depth may be rendered to the total number of multi view image, i.e., 35 multi view images. Accordingly, a sharp 3D image can be provided while maintaining natural viewpoint switching.

Figure 8:
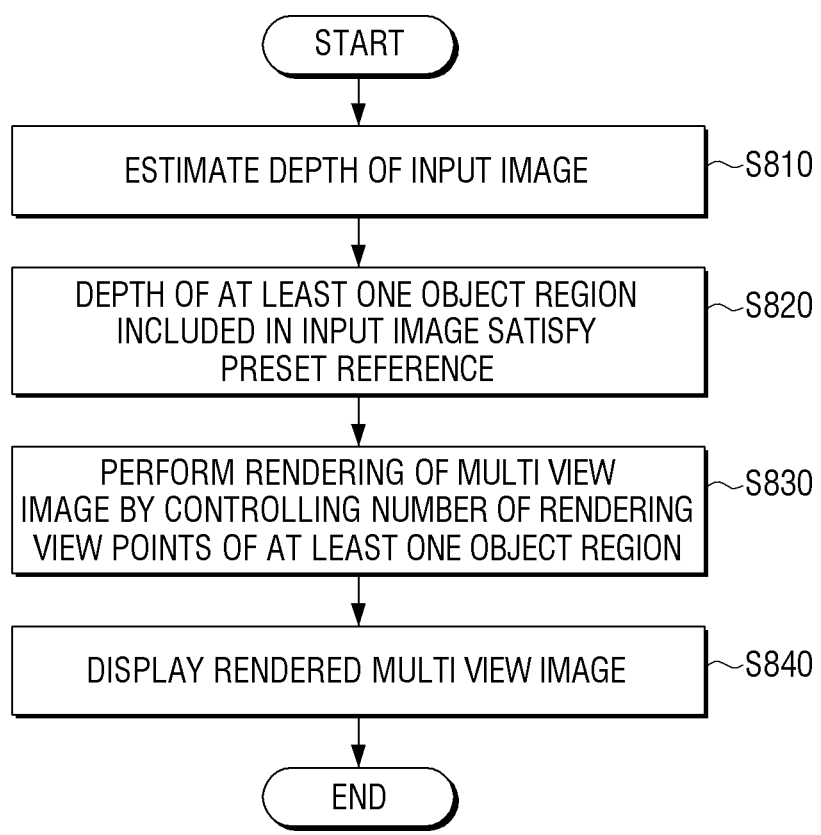
FIG. 8 is a flowchart illustrating a multi view image display method according to an exemplary embodiment.

FIG. 8 is a flowchart illustrating a multi view image display method according to an exemplary embodiment.

According to a multi view image display method as illustrated in FIG. 8, depth of an input image is first estimated (S810).

Then, the multi view images are rendered by controlling the number of rendering viewpoints according to a depth value of at least one object region included in the input image (S820).

Thereafter, the rendered multi view images are displayed (S830).

In this case, a display that displays the multi view images may include a display panel on which the rendered multi view images are displayed, and a viewing zone separator arranged on a front surface of the display panel to provide different optical views according to viewing regions.

Further, the rendering the multi view image (S820) may perform rendering of the multi view image by decreasing the number of rendering viewpoints of the at least one object region to be smaller than the number of rendering viewpoints of a remaining region if the depth of the at least one object region is equal to or larger than a predetermined depth value. In this case, the estimated depth information and the number of rendering viewpoints may be linearly or non-linearly in reverse proportion to each other.

In this case, the rendering the multi view image (S820) may perform the rendering of the multi view image through replacement of the multi view image so that at least a part of the multi view image that constitutes the at least one object region is repeated.

Further, the rendering the multi view image (S820) may perform the rendering of the multi view image through replacement of the at least one viewpoint image of the multi view image that constitute the at least one object region with a viewpoint image of an adjacent viewpoint that provides the same optical view.

Further, the rendering the multi view image (S820) may perform the rendering of the multi view image using a multi view image table that corresponds to the estimated depth information based on the multi view image table according to pre-stored depth information.

Further, the rendering the multi view image (S820) may perform the rendering of the multi view image by controlling the number of rendering viewpoints of the at least one object region to be equal to or smaller than a predetermined first number if the depth of the at least one object region is equal to or larger than a predetermined first depth value and by controlling the number of rendering viewpoints of the at least one object region to be equal to or smaller than a predetermined second number if the depth of the at least one object region is equal to or larger than a predetermined second depth value.

The second depth value may be larger than the first depth value, and the second number may be smaller than the first number.

As described above, according to various exemplary embodiments as described above, a non-glasses type 3D system which increases the sharpness of an image and decreases visual fatigue can be provided.

The multi view image display method according to various exemplary embodiments as described above may be implemented by a program, and the program may be provided to a display device or may be implemented by a processor or central processing unit (CPU).

As an example, a non-transitory computer readable medium may be provided, in which a program, which performs estimating depth of an input image, rendering the multi view image by controlling the number of rendering viewpoints according to a depth value of at least one object region included in the input image, and displaying the rendered multi view image, is stored.

The non-transitory computer readable medium is not a medium that stores data for a short period, such as a register, a cache, or a memory, but is a medium which semi-permanently stores data and is readable by a device. Specifically, various applications and programs as described above may be stored and provided in the non-transitory computer readable medium, such as, a CD, a DVD, a hard disc, a Blu-ray disc, a USB, a memory card, and a ROM.

While the disclosure has been shown and described with reference to certain exemplary embodiments, it will be understood by those skilled in the art that various changes in form and detail may be made therein without departing from the spirit and scope of the present disclosure, as defined by the appended claims.

What is claimed is:

1. A multi view image display device comprising:
    a depth estimator configured to estimate a depth of an input image;
    a renderer configured to perform rendering of a multi view image based on the estimated depth;
    a display configured to display the rendered multi view image; and
    a controller configured to control the rendering of the multi view image by adjusting a number of rendering viewpoints based on a depth value of at least one object region included in the input image,
    wherein the number of rendering viewpoints of the at least one object region is different from a number of rendering viewpoints of another region included in the input image, and
    wherein the controller is further configured to control the rendering of the multi view image by adjusting the number of rendering viewpoints of the at least one object region such that the number of rendering viewpoints of the at least one object region is smaller than a number of rendering viewpoints of a remaining region, different from the at least one object region, if the depth of the at least one object region is equal to or larger than a predetermined depth value.

2. The multi view image display device as claimed in claim 1, wherein the display comprises:
    a display panel which displays the rendered multi view image; and
    a viewing zone separator, disposed on a front surface of the display panel, which transmits light corresponding to different rendering viewpoints to different viewing regions, respectively.

3. The multi view image display device as claimed in claim 1, wherein the controller controls the rendering of the multi view image by replacing at least one viewpoint image of the multi view image with another viewpoint image of the multi view image that constitutes the at least one object region, such that the another viewpoint image is repeated.

4. The multi view image display device as claimed in claim 3, wherein the another viewpoint image is an image adjacent to the one viewpoint image and the one viewpoint image and the another viewpoint image provide the same optical view.

5. The multi view image display device as claimed in claim 3, further comprising a storage configured to store a multi view image table according to depth information,
    wherein the controller controls the rendering of the multi view image using the multi view image table that corresponds to the estimated depth information based on the multi view image table stored in the storage.

6. The multi view image display device as claimed in claim 1, wherein the controller adjusts the number of rendering viewpoints of the at least one object region such that the number of rendering viewpoints of the at least one object region is equal to or smaller than a predetermined first number if the depth of the at least one object region is equal to or larger than a predetermined first depth value, and adjusts the number of rendering viewpoints of the at least one object region such that the number of rendering viewpoints of the at least one object region is equal to or smaller than a predetermined second number if the depth of the at least one object region is equal to or larger than a predetermined second depth value.

7. The multi view image display device as claimed in claim 6, wherein the second depth value is larger than the first depth value, and the second number is smaller than the first number.

8. The multi view image display device as claimed in claim 1, wherein the estimated depth information and the number of rendering viewpoints are in reverse proportion to each other.

9. A multi view image display method comprising:
estimating a depth of an input image;
rendering the multi view image by adjusting a number of rendering viewpoints based on a depth value of at least one object region included in the input image; and
displaying the rendered multi view image,
wherein the number of rendering viewpoints of the at least one object region is different from a number of rendering viewpoints of another region included in the input image, and
wherein the rendering the multi view image performs rendering of the multi view image by adjusting the number of rendering viewpoints of the at least one object region such that the number of rendering viewpoints of the at least one object region is smaller than a number of rendering viewpoints of a remaining region, different from the at least one object region, if the depth of the at least one object region is equal to or larger than a predetermined depth value.

10. The multi view image display method as claimed in claim 9, wherein a display displays the multi view image and the display comprises a display panel on which the rendered multi view image is displayed; and a viewing zone separator, disposed on a front surface of the display panel, which transmits light corresponding to different rendering viewpoints to different viewing regions.

11. The multi view image display method as claimed in claim 9, wherein the rendering the multi view image comprises replacing at least one viewpoint image of the multi view image with another viewpoint image of the multi view image that constitute the at least one object region, such that the another viewpoint image is repeated.

12. The multi view image display method as claimed in claim 11, wherein the another viewpoint image is an image adjacent to the one viewpoint image and the one viewpoint image and the another viewpoint image provide the same optical view.

13. The multi view image display method as claimed in claim 11, wherein the rendering the multi view image comprises performing the rendering of the multi view image using a multi view image table that corresponds to the estimated depth information based on the multi view image table according to pre-stored depth information.

14. The multi view image display method as claimed in claim 9, wherein the rendering the multi view image comprises adjusting the number of rendering viewpoints of the at least one object region such that the number of rendering viewpoints of the at least one object region is equal to or smaller than a predetermined first number if the depth of the at least one object region is equal to or larger than a predetermined first depth value and by adjusting the number of rendering viewpoints of the at least one object region such that the number of rendering viewpoints of the at least one object region is equal to or smaller than a predetermined second number if the depth of the at least one object region is equal to or larger than a predetermined second depth value.

15. The multi view image display method as claimed in claim 14, wherein the second depth value is larger than the first depth value, and the second number is smaller than the first number.

16. The multi view image display method as claimed in claim 9, wherein the estimated depth information and the number of rendering viewpoints are in reverse proportion to each other.

* * * * *